(12) United States Patent
Orlans et al.

(10) Patent No.: US 12,510,169 B2
(45) Date of Patent: Dec. 30, 2025

(54) FLUID CONTROL VALVE

(71) Applicant: Tushar Jain, New Delhi (IN)

(72) Inventors: Yitzhak Orlans, Ojai, CA (US); Durga Pada Ghosh, Ghaziabad (IN)

(73) Assignee: Tushar Jain, New Delhi (IN)

( * ) Notice: Subject to any disclaimer, the term of this patent is extended or adjusted under 35 U.S.C. 154(b) by 9 days.

(21) Appl. No.: 18/688,089

(22) PCT Filed: Aug. 30, 2022

(86) PCT No.: PCT/IN2022/050767
§ 371 (c)(1),
(2) Date: Feb. 29, 2024

(87) PCT Pub. No.: WO2023/031957
PCT Pub. Date: Mar. 9, 2023

(65) Prior Publication Data
US 2024/0392882 A1    Nov. 28, 2024

(30) Foreign Application Priority Data
Sep. 4, 2021 (IN) .............. 202111040139

(51) Int. Cl.
*F16K 7/12* (2006.01)
(52) U.S. Cl.
CPC .................. *F16K 7/126* (2013.01)

(58) Field of Classification Search
CPC ............................ F16K 7/126; F16K 31/1262
See application file for complete search history.

(56) References Cited

U.S. PATENT DOCUMENTS

| | | | |
|---|---|---|---|
| 4,319,737 A | 3/1982 | Waterfield | |
| 5,632,465 A * | 5/1997 | Cordua | ................ F16K 31/402 251/30.02 |
| 7,527,241 B2 | 5/2009 | Tecnidro | |
| 9,285,041 B2 | 3/2016 | Mooney | |
| 10,774,940 B2 * | 9/2020 | Naor | ....................... F16K 7/126 |
| 11,009,137 B2 | 5/2021 | Ringer | |

FOREIGN PATENT DOCUMENTS

| | | | | |
|---|---|---|---|---|
| GB | 1408404 A * | 10/1975 | ......... | F16K 27/0236 |
| GB | 2250081 A * | 5/1992 | ........... | F16K 41/103 |

* cited by examiner

*Primary Examiner* — Hailey K. Do
(74) *Attorney, Agent, or Firm* — Dinsmore & Shohl LLP

(57) ABSTRACT

A fluid control valve accommodates a high flow of water with minimum pressure loss. The valve is configured with an inlet port extending into an inlet chamber, and an outlet port extending from an outlet chamber. The inlet and outlet chambers are partitioned by a curved sealing bridge. A control chamber accommodates a flexible sealing diaphragm deformable between a sealing position in which it sealingly bears over the curved sealing bridge and seals a fluid flow path extending between the inlet and outlet chambers, and an open position in which fluid flow along the flow path is enabled.

9 Claims, 5 Drawing Sheets

FLUID CONTROL VALVE

CROSS-REFERENCE TO RELATED APPLICATIONS

This application is the U.S. National Stage of PCT/IN2022/050767 filed on Aug. 30, 2022, which claims priority to Indian Patent Application 202111040139 filed on Sep. 4, 2021, the entire content of both are incorporated herein by reference in their entirety.

FIELD OF INVENTION

The present invention in general relates to a fluid control valve which precisely uses to accommodate high flow of water with minimum pressure loss.

BACKGROUND OF THE INVENTION

The background information herein below relates to the present disclosure but is not necessarily prior art.

Diaphragm-type fluid control valves can provide controlled fluid separation and flow along a pipe-line, manifold or other piping network. Generally, the diaphragm-type valve includes a flexible diaphragm element to control fluid flow between the inlet and the outlet of the valve body. More specifically, in known diaphragm-type valves, the diaphragm element engages a seat formed within the valve body to separate the interior chamber of the valve body into three parts: (the inlet chamber which can hold the supply fluid, and outlet chamber which receives fluid from the inlet chamber for discharge out the outlet and a diaphragm chamber which can hold a fluid under pressure to urge and maintain the diaphragm element in the seated position. Upon release of fluid pressure from the diaphragm chamber, the diaphragm element can be displaced from the seated position by the pressure of fluid in the inlet chamber and fluid flow is permitted between the inlet and the outlet chambers.

One particular application for using known diaphragm-control valves is in the control of fluid flow between a fluid source under pressure such as, for example, a water main, and another fluid volume such as, for example, a network of pipes filled with air. When a diaphragm-type valve is used to separate two fluid volumes that are to be independently pressurized, a check-valve is typically employed downstream of the diaphragm valve to form a seat against which the air or other fluid pressure may build downstream of the valve. For example, dry reaction fire protection systems employ a riser check-valve downstream of the diaphragm control valve to provide a seat for pressurizing the downstream network of pipes and sprinklers with pressurized gas.

Although various attempts are made before, for providing various fluid control valve and few of them are such as—U.S. Pat. No. 7,527,241B2 discloses diaphragm valve and open close element for said valve, U.S. Ser. No. 11/009,137B2 discloses fluid control valve system and methods, U.S. Pat. No. 9,285,041B2 discloses flow control valve and method of use and U.S. Pat. No. 4,319,737A discloses diaphragm valve.

There exist many drawbacks in the existing unit. Therefore, there is need to introduce a novel and efficient fluid control valve. Hence the present invention develops a fluid control valves.

An objective of the present invention is to attempt to overcome the problems of the prior art and provide a fluid control valve.

In a preferred embodiment, the present invention provides device which is use to accommodate high flow of water with minimum pressure loss.

These and other objects and characteristics of the present invention will become apparent from the further disclosure to be made in the detailed description given below.

SUMMARY OF THE INVENTION

Accordingly following invention provides a fluid control valve. The proposed invention is use to accommodate high flow of water with minimum pressure loss. The proposed fluid control valve comprising a valve body [100] configured with an inlet port [111] extending into an inlet chamber [109], and an outlet port [112] extending from an outlet chamber [110], a control chamber [113] accommodating a flexible sealing diaphragm [103] deformable between a sealing position in which it sealingly bears over the curve sealing bridge and seals a fluid flow path extending between the inlet chamber [109] and the outlet chamber [110], and an open position in which fluid flow along the flow path is enabled. This arrangement results in that the diaphragm [103] can be disposed into its open position also at significantly low pressure differentials and likewise, drifting of the diaphragm [103] into the outlet chamber [110] is more unlikely to occur.

BRIEF DESCRIPTION OF THE DRAWINGS

This invention is described by way of example with reference to the following drawing where.

In order that the manner in which the above-cited and other advantages and objects of the invention are obtained, a more particular description of the invention briefly described above will be referred, which are illustrated in the appended drawing. Understanding that these drawing depict only typical embodiment of the invention and therefore not to be considered limiting on its scope, the invention will be described with additional specificity and details through the use of the accompanying drawing.

DETAILED DESCRIPTION OF THE INVENTION

The following is a detailed description of embodiments of the disclosure depicted in the accompanying drawings. The embodiments are in such detail as to clearly communicate the disclosure. If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The present discloser relates, in general to fluid control valve and more particularly the device use to accommodating the high flow of water with minimum pressure loss.

Figure 1:
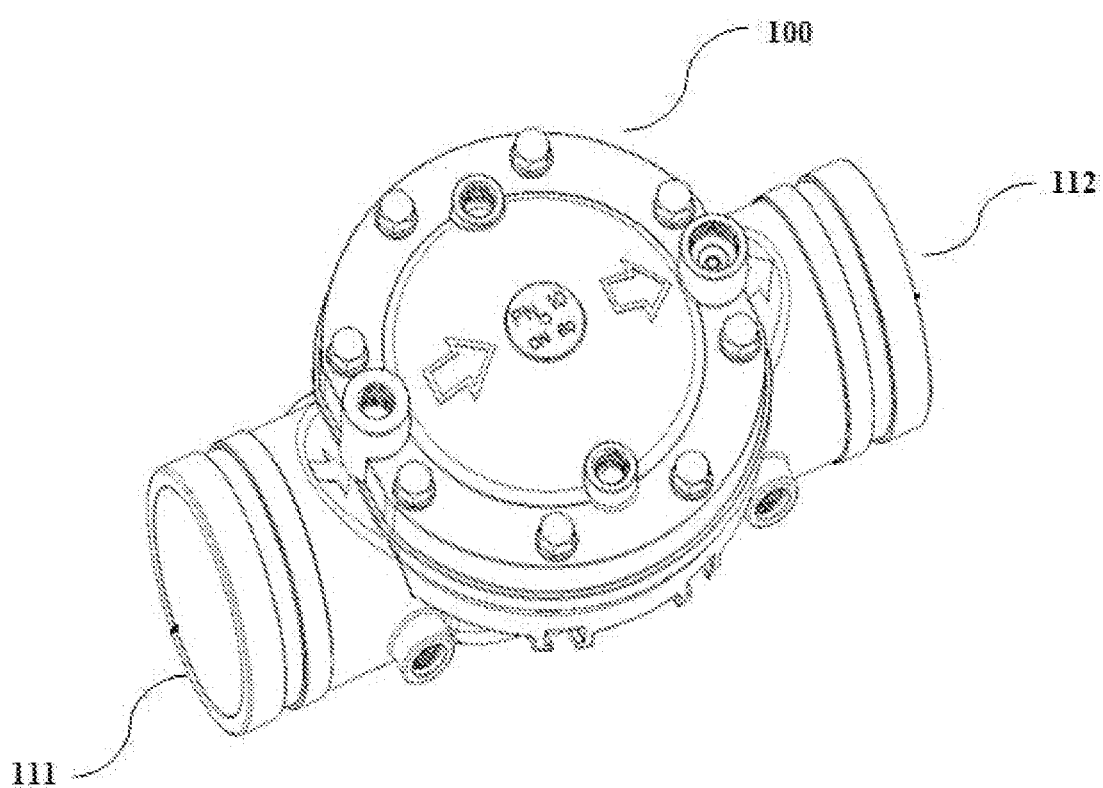
FIG. 1 of sheet 1 is an exemplary representation of proposed invention, whereas,
  111 denotes an inlet port,
  112 denotes an outlet port.
Figure 1A:
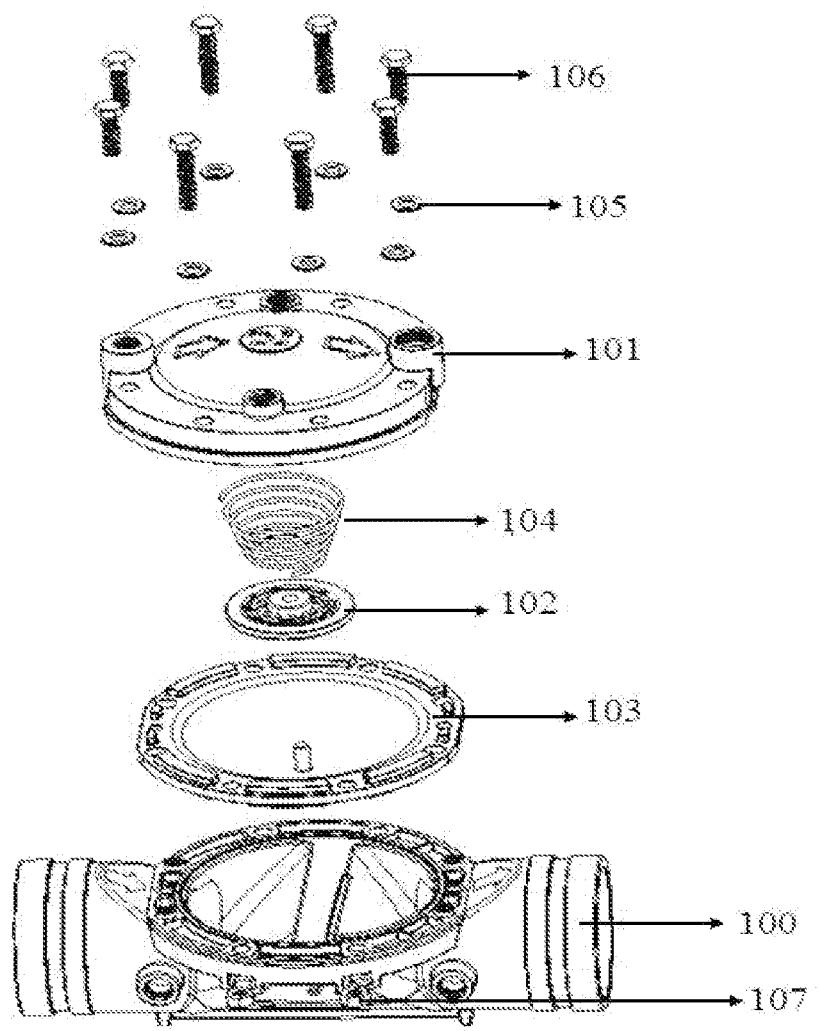
FIG. 1A of sheet 2 illustrates an exploded view of the proposed invention, whereas,
  100 denotes a body,
  101 denotes a cap,
  102 denotes a retainer,
  103 denotes a diaphragm,
  104 denotes a spring,
  105 denotes a washer,
  106 denotes a bolt,
  107 denotes a nut,
  108 denotes a curved sealing bridge.

FIGS. 1 and 1A of sheet 1 illustrates exemplary representation and exploded view of a fluid control valve, in accordance with an embodiment of the present disclosure.

Figure 2:
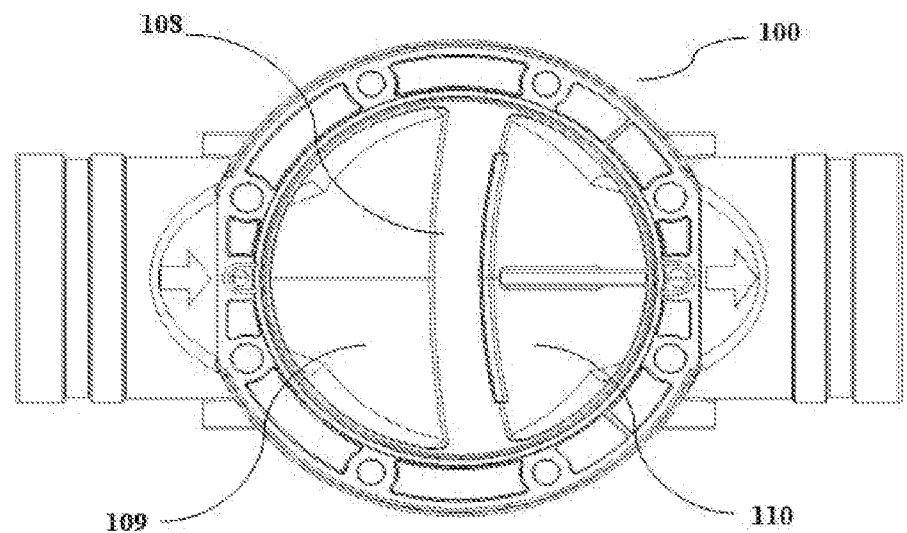
FIG. 2 of sheet 3 illustrates an isometric view of the body, whereas,
  109 denotes an inlet chamber,
  110 denotes an outlet chamber.

FIG. 2 of sheet 3 illustrates an isometric view of body [100].

Referring to FIG. 1 and FIG. 2, the device or valve comprising a valve body [100] configured with an inlet port [111] extending into an inlet chamber [109], and an outlet port [112] extending from an outlet chamber [110], wherein the inlet chamber [109] and the outlet chamber [110] are partitioned by a curved sealing bridge; a control chamber [113] accommodating a flexible sealing diaphragm [103] deformable between a sealing position in which it sealingly bears over the curved sealing bridge [108] and seals a fluid flow path extending between the inlet chamber and the outlet chamber [110].

In the embodiment, the valve body [100] is constructed in a circular manner for easy handle mounting purpose. Wherein a diaphragm [103] rib is also in a curve shape that rest on curved sealing bridge [108] body of the valve which is placed in between body [100] and a cap [101] with the help of a spring [104] and use to control fluid flow between the inlet [111] and the outlet [112] of the valve body.

Figure 3:
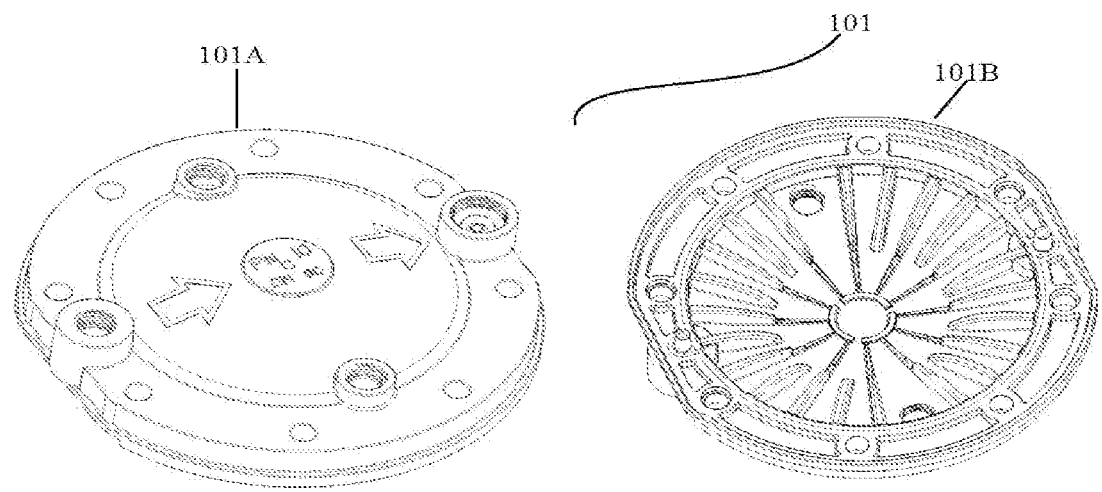
FIG. 3 of sheet 3 illustrates an isometric view of the cap, whereas,
  101A denotes an upper part of the cap,
  101B denotes lower part of the cap.

FIG. 3 of sheet 3 illustrates an exemplary representation of the cap [101]. The cap [101] with upper [101A] and lower part [101B] is fitted on the body [100] with a plurality of bolts [106].

Figure 4:
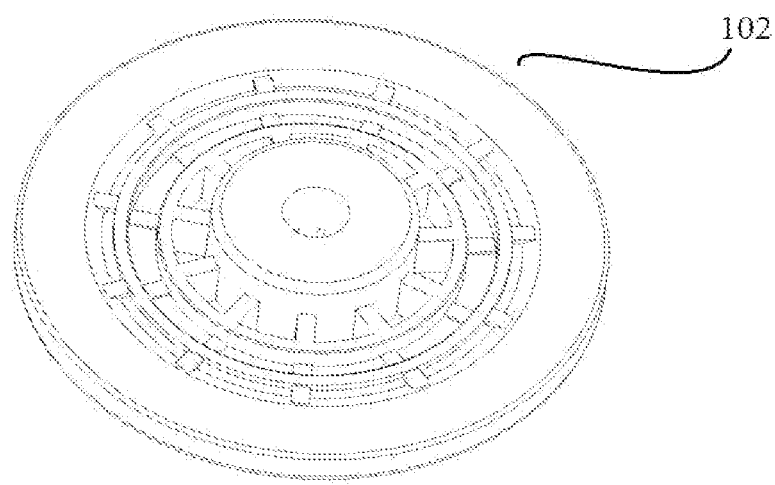
FIG. 4 of sheet 4 illustrates an isometric view of the retainer.

FIG. 4 of sheet 4 illustrate an exemplary representation of a retainer. Referring to FIG. 4 the retainer [102] is configured on the diaphragm [103] on which the spring [104] is placed.

Figure 5:
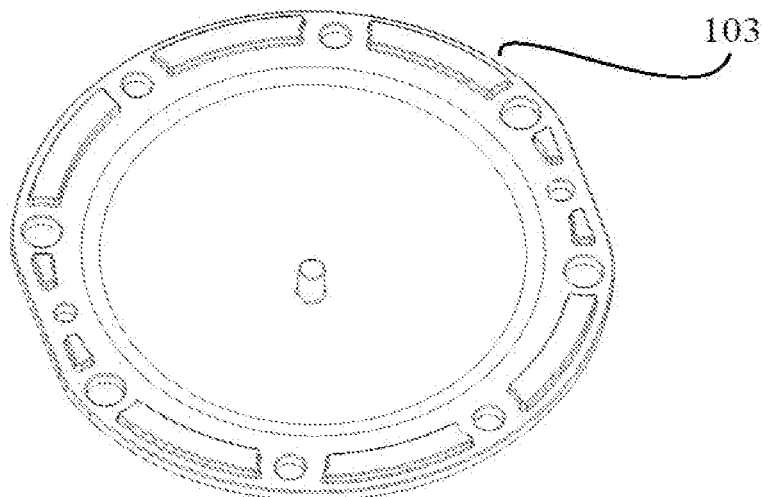
FIG. 5 of sheet 4 illustrates an isometric view of the diaphragm.

FIG. 5 of sheet 4 illustrate an isometric view of the diaphragm [103] which enabled with a curve shape rib.

Figure 6:
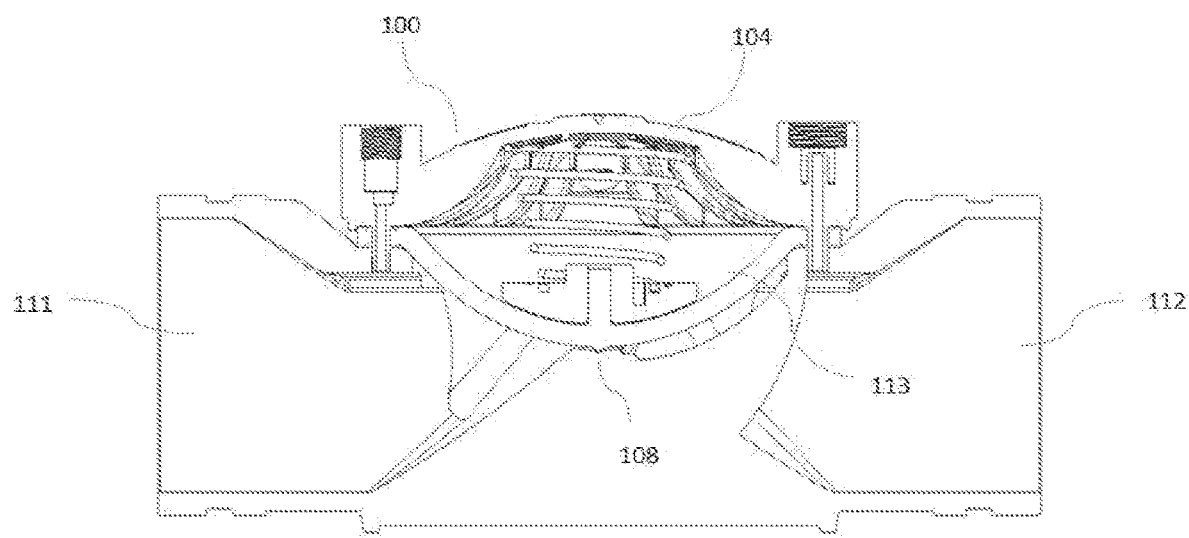
FIG. 6 of sheet 5 illustrates a sectional view of the valve, whereas 112 denotes a control chamber.

FIG. 6 of sheet 5 illustrates a sectional view of the valve.

Referring to FIG. 6, the curved sealing bridge [108] and diaphragm [103] rib is in a curve shape that makes for the valve an enlarged area at the upstream side of the valve while maintaining the same passage length at both the upstream and downstream path of water from the curved sealing bridge [108].

The water passage in the valve is designed in such way, that the stream line of water is constricted towards with the valve center position on the curved sealing bridge. This configuration passage of more water at a particular pressure with considerable lower pressure drop. The flowing water is streamlined preventing turbulent flow.

The shifting of curved sealing bridge [108] at the edges of the valve body [100] prevents over bending of the diaphragm [103], particularly along the sealing rib, prevents shifting of the diaphragm [103] under high pressure which in turn leads to less wear and tear. This increases the life of the valve.

Further the primary advantage of present invention is low pressure opening and quick reaction of valve. With the design and testing performed for present disclosure, the resultant flow coefficient is higher compared to competitive valves available in the market.

While various embodiments of the present disclosure have been illustrated and described herein, it will be clear that the disclosure is not limited to these embodiments only. Numerous modifications, changes, variations, substitutions, and equivalents will be apparent to those skilled in the art, without departing from the spirit and scope of the disclosure, as described in the claims.

The present disclosure provides a fluid control valve with curved bridge that will increase the perimeter length as against the straight bridge.

Further due to curved bridge design the flow streams are more organized and directed toward the centre of the curve causing less vortexes and less energy loss.

Further the present disclosure provides a larger water path above the curved bridge which will also reduce water velocity and reduce energy loss.

In the present disclosure the water passing over the bridge in a larger path will reduce velocity and decrease turbulent flow and negative vortex effect.

The present disclosure provides a organize flow stream due to the curve bridge describe above has a following major benefits:

Most of the water flow is directed toward the centre of the diaphragm, where the diaphragm is more flexible and accommodating which results in less vibration, faster reaction time to changing pressure or flow and reduction of stress in the diaphragm action. This is noticeable in existing prior art units during extreme pressure reduction applications where diaphragm up and down fluctuations are more prominent causing vibrations developed in the water flow line lead to damage the piping system.

We claim:

1. A fluid control valve, comprising:
    a valve body defining an interior comprising:
        an inlet chamber fluidly coupled to an inlet port, and
        an outlet chamber fluidly coupled to an outlet port;
    a curved sealing bridge disposed in the interior of the valve body to define an open control chamber between the inlet chamber and the outlet chamber, the curved sealing bridge extending within the interior of the valve body to form a crescent shaped opening into the inlet chamber; and
    a flexible sealing diaphragm that is deformable between a sealing position and an open position, wherein the flexible sealing diaphragm contacts the curved sealing bridge and forms a seal against the curved sealing bridge against a fluid flow path extending between the inlet chamber and the outlet chamber.

2. The fluid control valve as claimed in claim 1, wherein the valve body is a circular valve body.

3. The fluid control valve as claimed in claim 1, further comprising a diaphragm rib extending from the curved sealing bridge towards the open control chamber.

4. The fluid control valve as claimed in claim 1, further comprising a cap disposed over an opening into the interior, the cap removably secured to the valve body via a plurality of bolts.

5. The fluid control valve as claimed in claim 1, further comprising:
   a retainer disposed on the flexible sealing diaphragm; and
   a spring supported by the retainer, the spring configured to bias the flexible sealing diaphragm in the sealing position.

6. The fluid control valve as claimed in claim 1, wherein the flexible sealing diaphragm comprises a curve shape rib.

7. The fluid control valve as claimed in claim 1, wherein the curved sealing bridge is shaped to define a first volume of the inlet chamber and a second volume of the outlet chamber, wherein the first volume of the inlet chamber is greater than the second volume of the outlet chamber, and a first distance between the inlet port and the curved sealing bridge is equal to a second distance between the outlet port and the curved sealing bridge.

8. The fluid control valve as claimed in claim 1, wherein the curved sealing bridge defines a non-uniform curvature at an intersection of the curved sealing bridge and outer walls of the valve body to prevent over bending of the flexible sealing diaphragm and shifting of the flexible sealing diaphragm.

9. A fluid control valve, comprising:
   a valve body defining:
      an interior comprising:
         an inlet chamber fluidly coupled to an inlet port, and
         an outlet chamber fluidly coupled to an outlet port, and
      a central opening providing access to the inlet chamber and the outlet chamber, wherein a rim surrounds the central opening;
   a curved sealing bridge disposed between and separating the inlet chamber from the outlet chamber, the curved sealing bridge comprising a peripheral portion coupled to the rim, a central base portion disposed concentrically with respect to the central opening and located within the interior, and an intermediate portion connecting the peripheral portion to the central base portion, the intermediate portion having a non-uniform curvature that includes a first rate of curvature at a location adjacent to the inlet chamber and a second rate of curvature at a location adjacent to the outlet chamber such that a volume of the inlet chamber is greater than a volume of the outlet chamber;
   a rib extending from the curved sealing bridge at the central base portion, the rib extending towards the central opening of the valve body;
   a flexible sealing diaphragm having a first surface and a second surface opposite the first surface, the flexible sealing diaphragm being deformable between a sealing position and an open position, wherein the first surface of the flexible sealing diaphragm contacts the curved sealing bridge and the rib to form a seal against the curved sealing bridge against a fluid flow path extending between the inlet chamber and the outlet chamber;
   a cap disposed over the central opening of the valve body;
   a retainer disposed on the second surface of the flexible sealing diaphragm; and
   a biasing assembly disposed between the cap and the retainer and maintained in a biasing position by the cap and the retainer, the biasing assembly configured to bias the flexible sealing diaphragm in the sealing position.

\* \* \* \* \*